US010318932B2

(12) United States Patent
Bower et al.

(10) Patent No.: US 10,318,932 B2
(45) Date of Patent: Jun. 11, 2019

(54) PAYMENT CARD PROCESSING SYSTEM WITH STRUCTURE PRESERVING ENCRYPTION

(75) Inventors: Mark F. Bower, Sausalito, CA (US); Matthew J. Pauker, San Francisco, CA (US); Terence Spies, Mountain View, CA (US)

(73) Assignee: ENTIT SOFTWARE LLC, Sunnyvale, CA (US)

(*) Notice: Subject to any disclaimer, the term of this patent is extended or adjusted under 35 U.S.C. 154(b) by 1467 days.

(21) Appl. No.: 13/155,156

(22) Filed: Jun. 7, 2011

(65) Prior Publication Data
US 2012/0317036 A1 Dec. 13, 2012

(51) Int. Cl.
G06Q 20/20 (2012.01)
G06Q 20/02 (2012.01)
G06Q 20/38 (2012.01)
G06Q 20/40 (2012.01)

(52) U.S. Cl.
CPC ............. *G06Q 20/02* (2013.01); *G06Q 20/20* (2013.01); *G06Q 20/385* (2013.01); *G06Q 20/3823* (2013.01); *G06Q 20/40* (2013.01)

(58) Field of Classification Search
CPC ........... G06F 17/30864; G06F 21/6245; G06F 17/30386; G06F 17/30489; G06Q 20/4018; G06Q 20/4097; G06Q 30/0248; G06Q 30/0283; G06Q 20/32; G06Q 20/325; G06Q 30/0241; G06Q 10/083; G06Q 30/0215;
(Continued)

(56) References Cited

U.S. PATENT DOCUMENTS 4,771,461 A 9/1988 Matyas
4,965,568 A 10/1990 Atalla
(Continued)

FOREIGN PATENT DOCUMENTS

| EP | 1265200 | 12/2002 |
|----|---------|---------|
| WO | 2006/107777 | 10/2006 |
| WO | 2010141501 | 12/2010 |

OTHER PUBLICATIONS

Boneh et al. "Identity-Based Encryption from the Weil Pairing," from Crypto '2001 (Oct. 2002).
(Continued)

*Primary Examiner* — Steven S Kim
*Assistant Examiner* — Johann Y Choo (57) ABSTRACT

A customer may provide a merchant with primary account number information in connection with a purchase transaction. The merchant may send an associated authorization request to a payment card processor. A tokenization server at the payment card processor may generate a token corresponding to the primary account number. To secure the token, the token may be encrypted at the payment card processor using a cryptographic key shared with the merchant. A structure preserving encryption algorithm may be used in encrypting the token. A processor identifier may be embedded in the encrypted version of the token during the structure preserving encryption operation. The merchant can use the shared key to decrypt the token and extract the processor identifier. A settlement request may be directed to the processor from the merchant to settle the transaction using the processor identifier.

9 Claims, 7 Drawing Sheets

(58) Field of Classification Search
CPC ............... G06Q 20/102; G06Q 20/385; G06Q 20/3274; G06Q 20/322; G06Q 20/425
See application file for complete search history.

(56) References Cited

U.S. PATENT DOCUMENTS

| | | | |
|---|---|---|---|
| 5,768,561 A * | 6/1998 | Wise | G06F 3/14 |
| | | | 709/221 |
| 5,907,801 A * | 5/1999 | Albert | G06Q 20/04 |
| | | | 340/5.4 |
| 5,917,502 A * | 6/1999 | Kirkland | G06T 1/20 |
| | | | 345/505 |
| 6,169,803 B1 | 1/2001 | Sako | |
| 6,205,433 B1 * | 3/2001 | Boesch | G06Q 20/02 |
| | | | 705/27.1 |
| 6,240,513 B1 | 5/2001 | Friedman | |
| 6,327,578 B1 * | 12/2001 | Linehan | G06Q 20/02 |
| | | | 705/65 |
| 6,332,134 B1 * | 12/2001 | Foster | G06Q 20/02 |
| | | | 705/36 R |
| 6,442,629 B1 * | 8/2002 | Arimilli | G06F 13/37 |
| | | | 710/100 |
| 6,886,096 B2 | 4/2005 | Appenzeller et al. | |
| 6,985,583 B1 | 1/2006 | Brainard | |
| 7,003,117 B2 | 2/2006 | Kacker et al. | |
| 7,113,594 B2 | 9/2006 | Boneh et al. | |
| 7,370,202 B2 | 5/2008 | Appenzeller et al. | |
| 7,412,059 B1 | 8/2008 | Pauker et al. | |
| 7,424,614 B2 | 9/2008 | Appenzeller et al. | |
| 7,523,314 B2 | 4/2009 | Spies et al. | |
| 7,590,236 B1 | 9/2009 | Boneh | |
| 2001/0044764 A1 * | 11/2001 | Arnold | G06Q 20/04 |
| | | | 705/35 |
| 2002/0055909 A1 * | 5/2002 | Fung | G06Q 20/10 |
| | | | 705/42 |
| 2002/0073045 A1 * | 6/2002 | Rubin | G06Q 20/04 |
| | | | 705/65 |
| 2002/0112154 A1 | 8/2002 | Wallace | |
| 2002/0179401 A1 * | 12/2002 | Knox | G06O 20/28 |
| | | | 194/217 |
| 2004/0008846 A1 | 1/2004 | Medvinsky | |
| 2004/0011866 A1 * | 1/2004 | Saad | G06Q 10/08 |
| | | | 235/380 |
| 2004/0044739 A1 | 3/2004 | Ziegler | |
| 2004/0181463 A1 | 9/2004 | Goldwaite | |
| 2005/0204128 A1 | 9/2005 | Aday | |
| 2006/0010324 A1 | 1/2006 | Appenzeller et al. | |
| 2006/0149683 A1 | 7/2006 | Shimojima | |
| 2006/0229991 A1 | 10/2006 | Campagna | |
| 2007/0007358 A1 * | 1/2007 | White | G06F 21/606 |
| | | | 235/492 |
| 2007/0041583 A1 | 2/2007 | Boneh | |
| 2007/0276765 A1 | 11/2007 | Hazel | |
| 2007/0277013 A1 | 11/2007 | Rexha et al. | |
| 2008/0103982 A1 | 5/2008 | Hammad et al. | |
| 2009/0144202 A1 | 6/2009 | Hurry | |
| 2009/0202081 A1 | 8/2009 | Hammad | |
| 2009/0310778 A1 | 12/2009 | Mueller | |
| 2010/0211507 A1 | 8/2010 | Aabye | |
| 2010/0257612 A1 * | 10/2010 | McGuire | G06Q 20/383 |
| | | | 726/26 |
| 2010/0293099 A1 | 11/2010 | Pauker | |
| 2011/0137802 A1 | 6/2011 | Spies | |
| 2011/0161233 A1 * | 6/2011 | Tieken | G06Q 20/04 |
| | | | 705/71 |
| 2011/0211689 A1 * | 9/2011 | von Mueller | G06Q 20/085 |
| | | | 380/28 |
| 2012/0039469 A1 * | 2/2012 | Mueller | G06Q 20/12 |
| | | | 380/252 |

OTHER PUBLICATIONS

Pauker, Matthew J. et al. U.S. Appl. No. 12/467,188, filed May 15, 2009.
Schneir, Bruce, "Applied Cryptography, Second Edition", John Wiley * Sons, Inc. 1996, pp. 1-56.
Spies, Terence et al. U.S. Appl. No. 12/791,593, filed Jun. 1, 2010.

* cited by examiner

PAYMENT CARD PROCESSING SYSTEM WITH STRUCTURE PRESERVING ENCRYPTION

BACKGROUND

This invention relates to online transactions, and more particularly, to ways to help secure sensitive data during online transactions.

Online transactions such as purchase transactions often require that entities such as merchants and payment card processors exchange sensitive information. For example, in connection with a typical purchase by a customer, a merchant may obtain the primary account number (PAN) corresponding to the payment card account of a customer (e.g., the customer's credit card number). The merchant may provide the PAN to a payment card processor (payment processor) as part of an authorization request. The payment processor may use a tokenization server to generate a corresponding token that is provided to the merchant if the purchase is authorized. Later, when settling the purchase transaction, the merchant may submit the token and the settlement amount to the payment processor. The payment processor may recover the PAN of the customer from the token.

Because the token can be used to settle the purchase transaction, the token should not be exposed to any unauthorized parties. In environments with numerous merchants or merchants with numerous sub-entities, it can be challenging to secure tokens, leading to potential security vulnerabilities.

It would therefore be desirable to be able to provide improved ways in which to handle sensitive data such as tokens in connection with online transactions.

SUMMARY

A customer may provide a merchant with primary account number information for a payment card in connection with a purchase transaction. The merchant may send an associated authorization request to a payment card transaction processor. The authorization request may include information on a monetary value associated with the desired purchase transaction and the primary account number.

If the payment card processor determines that the customer is authorized to make the desired purchase, a tokenization server at the payment card processor may generate a token corresponding to the primary account number. To secure the token, the token may be encrypted at the payment card processor using a cryptographic key shared with the merchant.

A structure preserving encryption algorithm may be used in encrypting the token. A processor identifier or other information may be embedded in the encrypted version of the token during the structure preserving encryption operation. The merchant can use the shared key to decrypt the token and extract the processor identifier. A settlement request may be directed to the processor from the merchant to settle the transaction. The settlement request may include the decrypted version of the token and the monetary settlement amount associated with the purchase transaction. The merchant may use the processor identifier to direct the settlement request to the appropriate payment card processor.

Further features of the invention, its nature and various advantages will be more apparent from the accompanying drawings and the following detailed description of the preferred embodiments.

DETAILED DESCRIPTION

Figure 1:
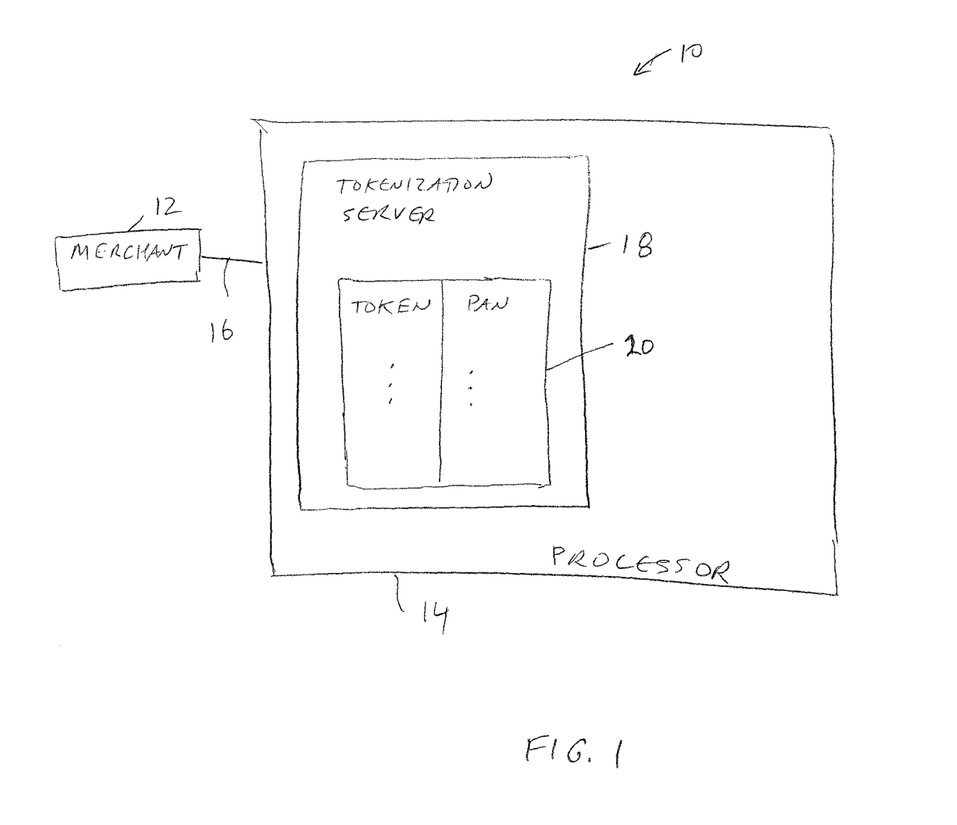
FIG. 1 is a system diagram showing equipment involved in processing an online purchase transaction in accordance with an embodiment of the present invention.

Merchants authorize and settle payment card purchase transactions by communicating electronically with payment card processors. An illustrative system 10 in which payment card transactions may be authorized and settled is shown in FIG. 1. As shown in FIG. 1, merchant 12 may communicate with payment card processor 14 over communications network 16. Merchant 12 may be a brick-and-mortar merchant (e.g., a hotel, store, etc.) or may be an online merchant. Payment card processor 14 may be associated with one or more payment card companies. For example, payment card processor 14 may be affiliated with a bank or a credit card company or may be a third party service that services payment requests for multiple credit card companies (as examples). Communications network 16 may include wired and wireless networks, local area networks, wide area networks such as the Internet, or other suitable communications paths.

Figure 2:
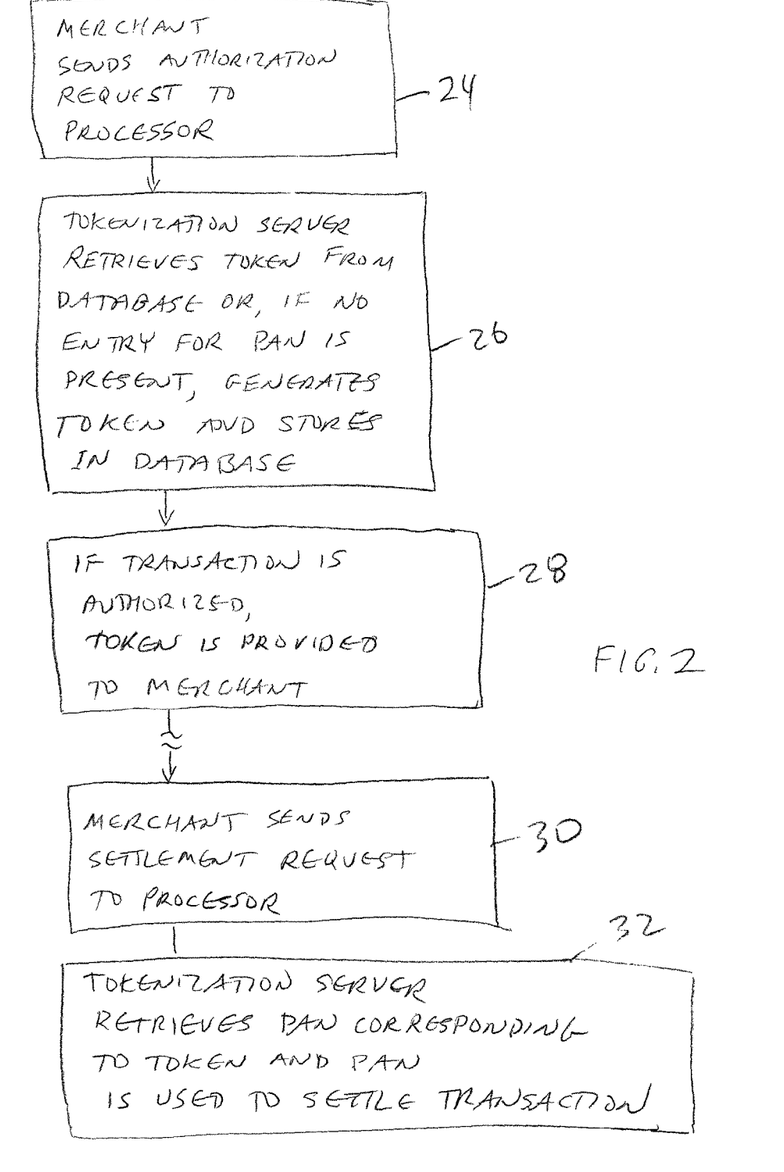
FIG. 2 is a flow chart of illustrative steps involved in authorizing and settling payment transactions for merchants in accordance with an embodiment of the present invention.

Steps involved in an illustrative purchase transaction using a system of the type shown in FIG. 1 are shown in FIG. 2.

A customer desires to make a purchase at merchant 12. To make the purchase, merchant 12 obtains the primary account number (PAN) associated with the payment card account of the customer (e.g., the customer's credit card number). For example, a magnetic card reader or other equipment at the merchant may be used to read the PAN from the customer's card. At step 24, the merchant may submit an authorization request to payment processor 14 over network 16 to determine whether the customer is authorized to make a purchase. The authorization request generally includes the PAN and a requested authorization amount. The authorization amount may be somewhat larger than the actual expected purchase price.

In response to receiving an authorization request, payment card processor 14 determines whether the customer is authorized to make a purchase of the requested amount. If authorized, processor 14 may return a token to the merchant that corresponds uniquely to the customer's PAN. Processor 14 may use tokenization server 18 to manage tokens during the operations of step 26. Tokenization server 18 may maintain database 20. Database 20 may contain a list of PANs and corresponding tokens. Each entry in database 20 may include a PAN and a unique token for that PAN. When presented with a PAN at step 26, tokenization server 18 may consult database 20 to determine whether an entry for that PAN already exists. If an entry is present, the tokenization server may retrieve the token associated with the PAN. If no entry is currently present for the PAN, tokenization server 18 may generate a token for the PAN and may store the generated token in database 20 for future use.

After obtaining a token for the PAN in the authorization request from tokenization server 18 during the operations of step 26, payment card processor 14 may return the token to merchant 12 for use in settling the purchase transaction (step 28).

At a later time, the merchant may settle the purchase transaction by submitting a settlement request to payment processor 14 (step 30). The settlement request may include the token and the final purchase transaction amount (i.e., a monetary value). The final purchase transaction amount may be equal to the previously authorized amount or may be different from the previously authorized amount. As an example, if authorization was requested for $500, the settlement amount may be for $134. In processing the settlement request during the operations of step 32, the payment processor may use tokenization server 18 to retrieve the PAN associated with the transaction based on the token. After processor 14 has processed the settlement request with a settlement process running on the computing equipment of processor 14 that uses the retrieved PAN, the merchant may be informed of successful completion of the purchase transaction over network 16.

It may be desirable to use encryption techniques to help secure sensitive data during purchase transactions. For example, it may be desirable to use format preserving encryption algorithms and structure preserving encryption algorithms to encrypt tokens such as the token provided to the merchant at step 28 of the flow chart of FIG. 2. Encryption of tokens may help prevent tokens from being misappropriated by unauthorized parties.

Figure 3:
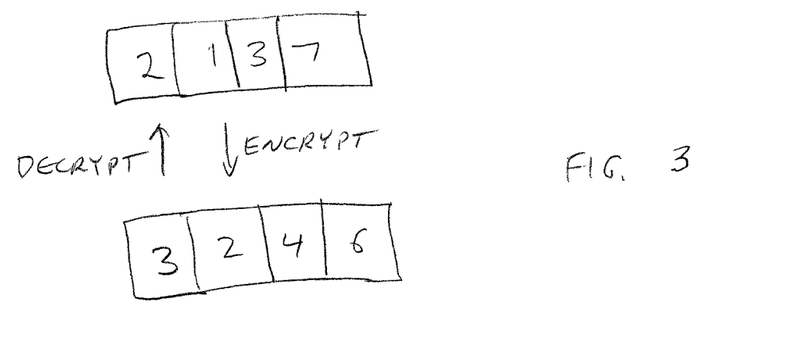
FIG. 3 is a diagram showing how a value may be encrypted and decrypted using a format preserving encryption algorithm in accordance with an embodiment of the present invention.

In format preserving encryption schemes, strings may be encrypted using a format preserving encryption (FPE) process that preserves the format of the string. During decryption operations, a corresponding FPE decryption process may be used in decrypting the encrypted string. An example is shown in FIG. 3. Initially, a string may have an unencrypted value of 2137 (as an example). In this example, each value of the string has a valid set of characters selected from the range of 0-9 (i.e., the characters in the unencrypted string are all digits). By applying an FPE encryption algorithm to the string 2137, a corresponding encrypted version of the string is produced. In the example of FIG. 3, the encrypted version of the string is 3246. Because the encryption algorithm that was used to perform encryption was an FPE algorithm, the encrypted version of the string falls within the same character space as the original unencrypted version of the string. In particular, the string 3246 contains the same number of characters as string 2137 and each character in encrypted string 3246 is a digit with a value of 0-9.

The unencrypted version of the string (i.e., 2137 in the example of FIG. 3) is sometimes referred to as plaintext. The corresponding encrypted version of the string (i.e., 3246 in the example of FIG. 3) is sometimes referred to as ciphertext. During encryption, plaintext is converted to ciphertext without altering the format of the string using the FPE encryption algorithm. During decryption, the ciphertext is decrypted to produce the plaintext without altering the format of the string (i.e., by preserving the illustrative four-digit format in the FIG. 3 example).

Format preserving encryption algorithms may be used to encrypt and decrypt strings of any suitable format (e.g., strings whose valid characters are letters, mixtures of letters and digits, subsets of the letter characters, subsets of the digit characters, selected sets of letters, selected sets of digits, selected sets of characters that include mixtures of letters and digits, non-digit characters such as letters and/or non-letter characters, non-letter characters such as digits and/or symbols, symbols, non-symbol characters, etc.). As one example, an FPE process may be used to encrypt and decrypt strings having the format of CCDDD, where C represents upper and lowercase letter characters and where D represents digit characters.

An extension to FPE algorithms may be used that allows a string in a first format to be transformed into a string in a second format. For example, an all-digit string (DDDD) may be encrypted to produce a corresponding encrypted string with two leading digits and two trailing letter characters (DDCC). In this type of arrangement, which is sometimes referred to as structure preserving encryption (SPE) or format preserving encryption, it is not necessary for the first and second formats to be identical. Rather, the first and second formats may be arbitrarily selected when setting up the SPE process.

Figure 4:
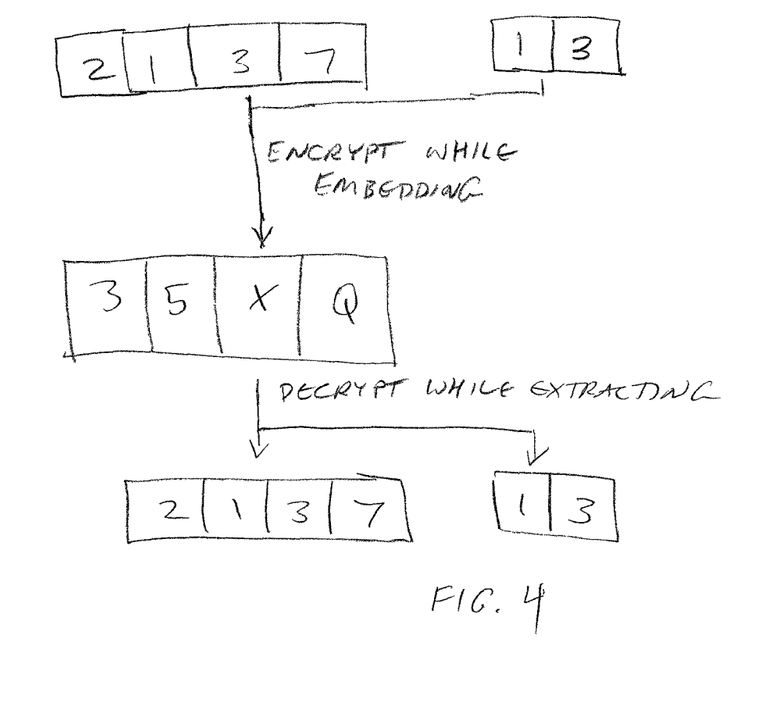
FIG. 4 is a diagram showing how a value may be encrypted while embedding information and may be decrypted to extract the embedded information using a structure preserving encryption algorithm in accordance with an embodiment of the present invention.

An example of an SPE process is shown in FIG. 4. The SPE process may be used in performing encryption operations and decryption operations. In the example of FIG. 4, plaintext 2137 is encrypted to produce corresponding ciphertext 35XQ. The format of plaintext string 2137 is DDDD, where D represents a digit having a value from 0 to 9. The format of ciphertext string 35XQ is DDCC, where D represents a digit having a value of 0 to 9 and C represents an uppercase letter character having a value of A to Z. During decryption operations with the SPE process, ciphertext 35XQ is decrypted to produce plaintext 2137 in its original format.

The original and target character spaces may be of equal size or may be of different sizes. When the ciphertext strings are represented in a larger space than the plaintext strings, it is possible to embed information within the ciphertext as part of the encryption operation. In the illustrative arrangement of FIG. 4, the target encoding space for the ciphertext version of the string (DDCC) is larger than the encoding space for plaintext version of the string (DDDD). This allows additional information such as two-digit string "13" to be embedded within ciphertext 35XQ. The embedded information (i.e., the value "13") may be extracted from the ciphertext by the SPE process during decryption operations, as shown in FIG. 4. An example of a cryptographic algorithm that may be used to implement an FPE or SPE process is the FFX mode of AES (Advanced Encryption Standard). This is merely illustrative. Any suitable FPE or SPE algorithms may be used in encrypting and decrypting tokens and other sensitive information associated with purchase transactions if desired.

Figure 5:
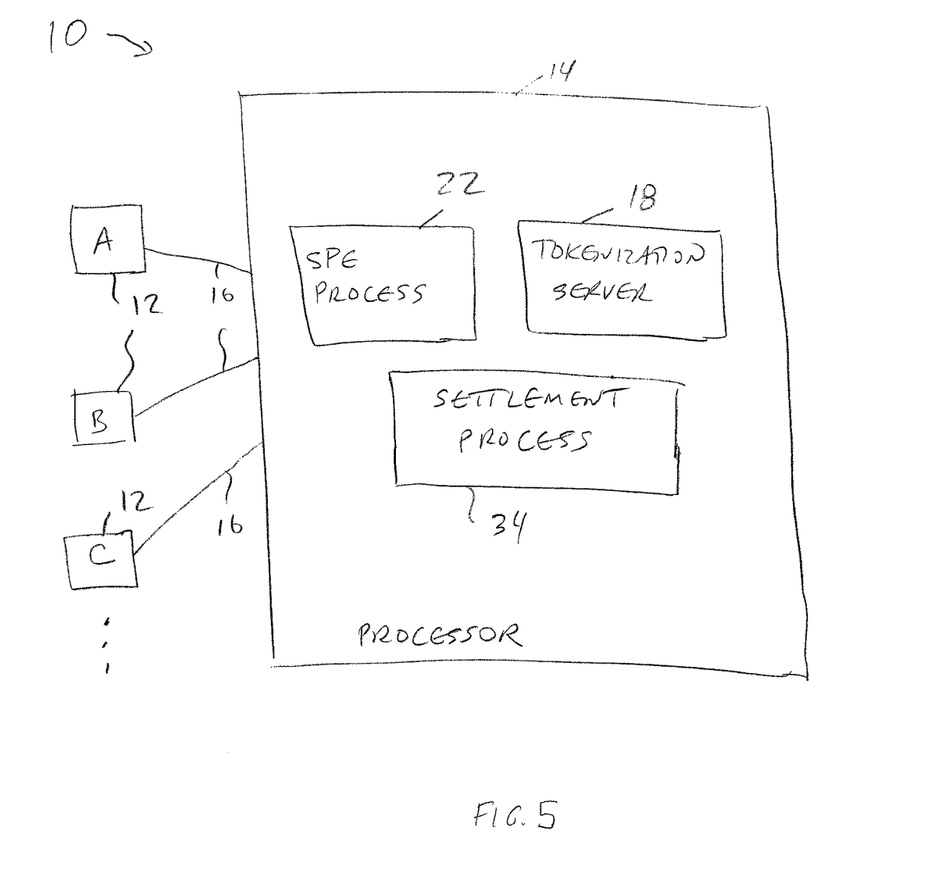
FIG. 5 is a diagram of an illustrative system in which a payment processor with a structure preserving encryption process is used to authorize and settle payment transactions for multiple merchants in accordance with an embodiment of the present invention.

Payment card processor 14 of illustrative system 10 of FIG. 5 includes SPE process 22. SPE process 22, tokenization server 18, settlement process 34, and other process in system 10 (e.g., processes at merchants 12) may run on computers or other suitable computing equipment (i.e., each merchant 12 and payment card processor 14 may include one or more computers, networks of computers, servers, microprocessors, mainframes, or other computing equipment that executes code associated with encryption and decryption processes, database management processes, authentication processes, settlement processes, token generation processes, fraud detection processes, etc.).

In the illustrative system configuration of FIG. 5, multiple merchants A, B, and C are associated with a common payment card processor 14. During authorization requests, tokenization server 18 may be used to generate tokens, as described in connection with system 10 of FIG. 1. Settlement process 34 may be used to settle purchase transactions when payment processor 14 is presented with a token as part of a settlement request.

Security may be enhanced by encrypting tokens so that a token cannot be used by an unauthorized party such an attacker associated with a merchant other than the intended recipient of the token or another unauthorized party. To ensure that tokens that are generated for one merchant cannot be used by personnel at another merchant or other unauthorized party, SPE process 22 can transform generally applicable ("global") tokens that are generated by tokenization server 18 into merchant-specific tokens. In particular, SPE process 22 can convert a global token that is generated by tokenization server 18 for use by merchant A into a merchant-A-specific token by SPE-encrypting the global token using a key associated with merchant A. SPE process 22 can convert a global token that is generated by tokenization server 18 for use by merchant B into a merchant-B-specific token by SPE-encrypting the global token using a key associated with merchant B. SPE process 22 can likewise derive additional merchant-specific tokens using additional keys.

Merchants 12 can use corresponding SPE processes (and merchant-specific keys that are shared with the processor) to decrypt the encrypted version of the token. The decrypted version of the token may then be provided from the merchant to the processor during settlement requests. The processor can detokenize the decrypted version of the token using its tokenization server.

In some system configurations, merchants (e.g., large organizations) may wish to secure tokens so that respective sub-entities (e.g., offices, stores, branches, or other portions of a merchant's business) each receive tokens that have been individually encrypted. As shown in system 10 of FIG. 6, for example, merchants 12 may contain sub-entities 12'. Merchants 12 may be associated with corporations (e.g., retail or wholesale businesses) or other organizations. Sub-entities 12' may correspond to stores, collections of stores, parts of stores, branches, geographic regions, offices, divisions, or other portions of merchants 12. As an example, merchant A may be a chain store and sub-entities A1, A2, and A3 may be particular brick-and-mortar stores within the chain. As another example, merchant A may be a bank and sub-entities A1, A2, and A3 may correspond to divisions within the bank (e.g., a consumer division, a business division, etc.).

Figure 6:
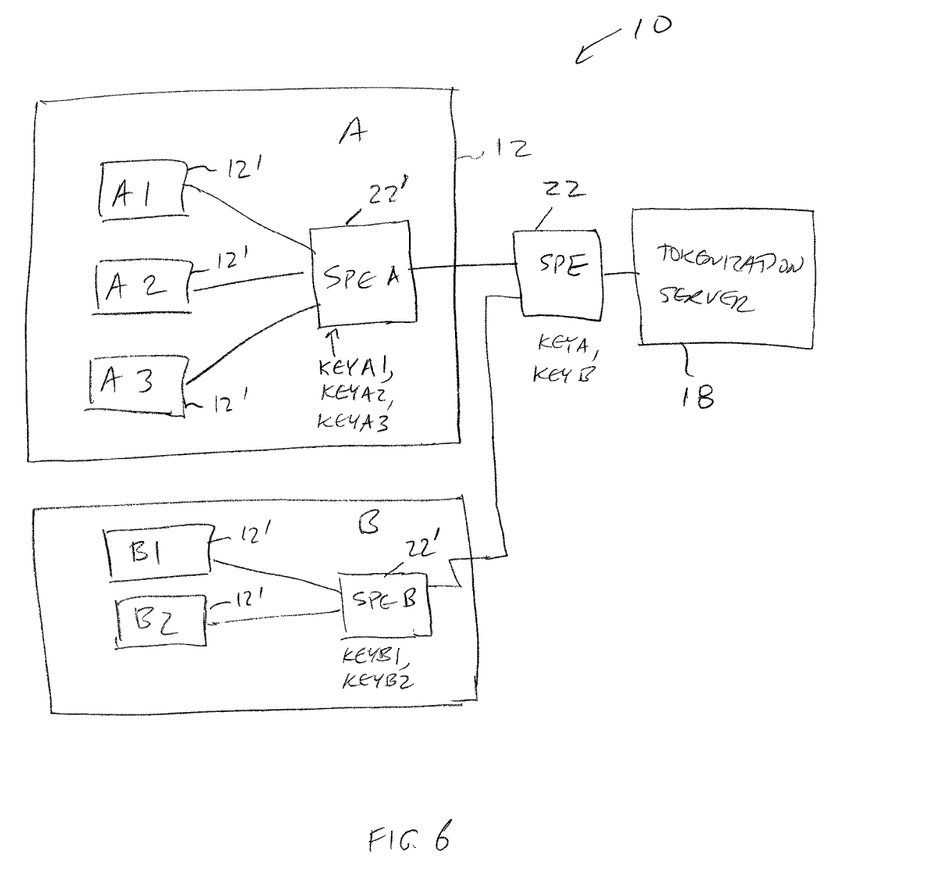
FIG. 6 is a diagram of an illustrative system having a hub and spoke configuration in which structure preserving encryption processes are used in handling authorization and settlement transactions for merchants having multiple offices or other sub-entities in accordance with an embodiment of the present invention.

In illustrative system 10 of FIG. 6, SPE processes may be organized in a hub-and-spoke configuration. As shown in FIG. 6, for example, SPE process 22 may correspond to a "hub" in system 10 that is connected to multiple "spoke" SPE processes 22'. Processes 22 and 22' and tokenization server 18 may be associated with a payment processor. As shown FIG. 6, spoke SPE processes 22' may, if desired, be associated with merchants (e.g., SPE processes 22' may be implemented using computing equipment associated with merchants 12). If desired, SPE processes 22' may also be implemented using computing equipment associated with other entities (i.e., computing equipment associated with payment processor 14).

When tokenization server 18 generates tokens for merchant A, SPE process 22 may encrypt the tokens using a key that is specific to merchant A (i.e., keyA). When tokenization server 18 generates tokens for merchant B, SPE process 22 may encrypt the tokens using a token that is specific to merchant B (i.e., keyB). SPE process 22' may be used to further customize a merchant-A-specific token that is produced at the output of process 22. For example, the output of process 22 (i.e., the encrypted version of the token from server 18) can be encrypted using keyA1 to produce tokens specific to sub-entity A1, can be encrypted using keyA2 to produce tokens specific to sub-entity A2, and can be encrypted using keyA3 to produce tokens specific to sub-entity A3.

If desired, SPE processes such as processes 22 and 22' of FIG. 6 may embed information in tokens during encryption, as described in connection with FIG. 4. Any suitable information may be embedded in tokens using this type of technique. For example, each processor (and tokenization server) may have an associated identifier (i.e., a processor ID). During encryption, SPE processes 22 may embed information such as the processor ID into the token. This information can later be extracted by a merchant and used in determining where to route settlement requests, as described in connection with FIG. 4.

Figure 7:
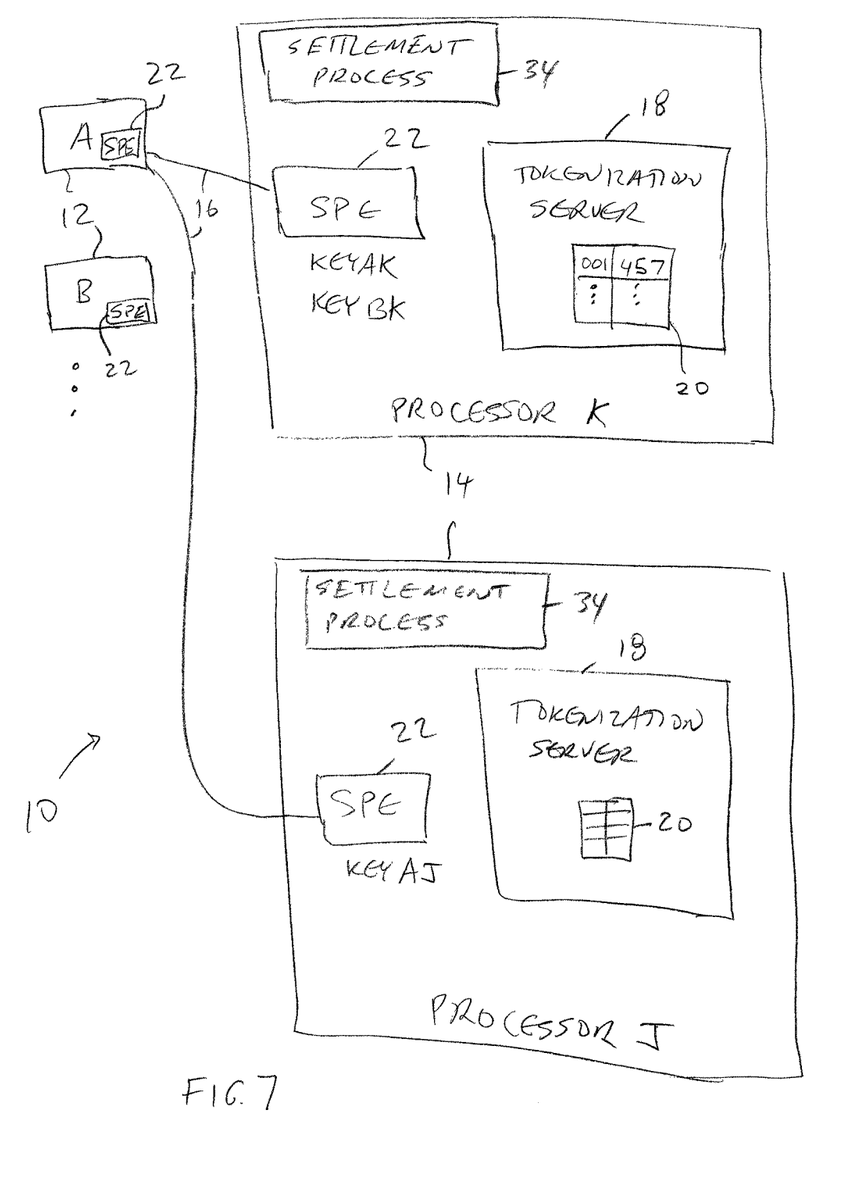
FIG. 7 is a diagram of an illustrative system in which merchants may be associated with multiple payment processors in accordance with an embodiment of the present invention.

Consider, as an example, illustrative system 10 of FIG. 7. In system 10 of FIG. 7, there are multiple payment card processors (i.e., processors K and J) and multiple merchants 12 (e.g., merchants A, B, . . . ). Each processor may have a corresponding tokenization server 18 (or other tokenization process) for generating tokens corresponding to PANs provided by merchants 12 as part of authorization requests. Tokenization servers 18 may maintain corresponding databases 20. Each database 20 may contain a list that maps PANs to respective tokens. When a PAN from an authorization request is located in this list, a tokenization server 18 may retrieve the token for that PAN from the list. Server 18 may generate tokens in real time for PANs that are not already contained in the tokenization server database.

Each processor 14 in system 10 of FIG. 7 may have a settlement process 34 that is used in settling purchase transactions. Merchants 12 may provide processors 14 with settlement requests that include a settlement amount (e.g., a monetary value associated with the payment transaction) and the token that the merchant has previously been provided with in connection with the transaction. The settlement process at a processor can provide the token from the settlement request to the tokenization server at the processor to obtain the PAN corresponding to the payment card account that is to be debited by the specified monetary value.

To enhance efficiency, it may be advantageous for a merchant that has relationships with multiple processors to be provided with information that identifies which processor was used to provide each token. In this way, merchants can avoid providing settlement requests to settlement processes 14 at incorrect payment processors. The information that identifies the processor (e.g., a processor ID) may be embedded within each token using an SPE encryption process, as described in connection with FIG. 4. Merchants 12 can extract the processor ID using a corresponding SPE decryption process 22 (as shown in FIG. 7). Once the processor ID for a token is known, a merchant can route the settlement request for the token to the processor that is associated with that processor ID. The submission of settlement requests to incorrect processors can be avoided.

Figure 8:
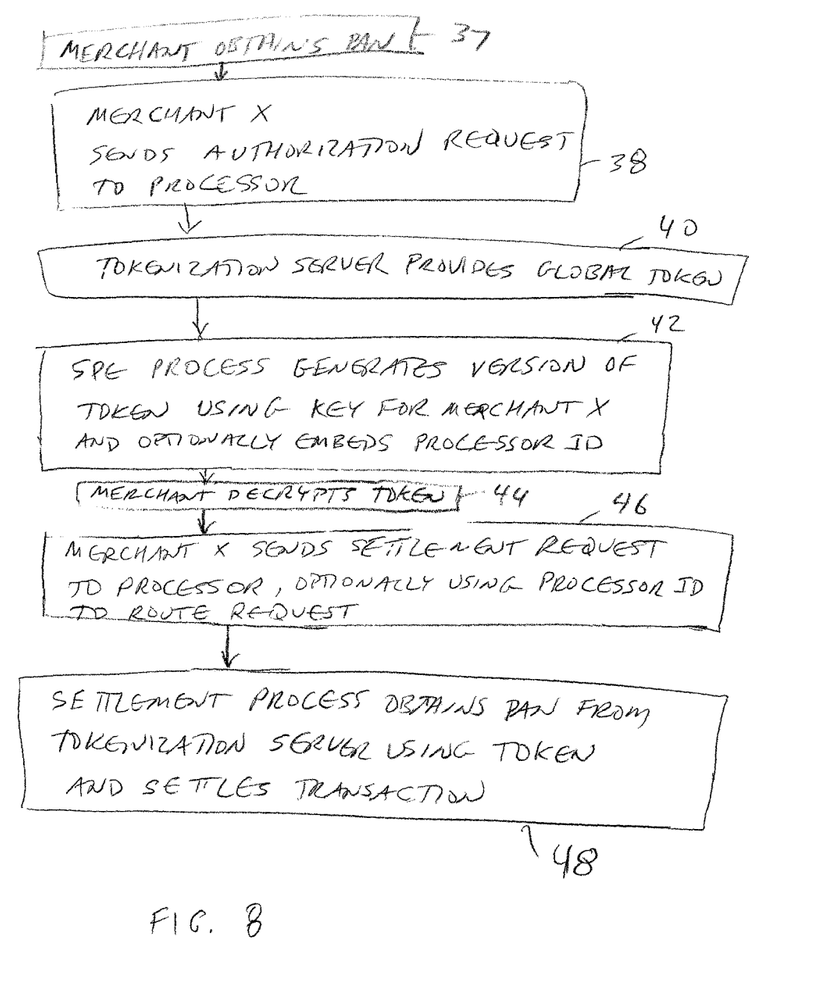
FIG. 8 is a flow chart of illustrative steps involved in handling authorization and settlement requests in accordance with an embodiment of the present invention.

FIG. 8 is a flow chart of illustrative steps involved in handling payment transactions in systems using SPE-encrypted tokens such as the illustrative system of FIG. 7.

At step 37, one of merchants 12 (i.e., merchant "X") may obtain a PAN of a customer (e.g., using a payment card magnetic stripe reader or other suitable computing equipment). The PAN and information on the monetary value of the desired payment transaction contemplated by the customer may be gathered in connection with an online purchase, in connection with a purchase at a brick-and-mortar establishment, or in connection with other suitable payment activities.

At step 38, computing equipment at the merchant may be used to formulate an authorization request with one or processors 14 (e.g., processor "Q"). Merchant X may be, for example, merchant A or merchant B of FIG. 7. Processor Q may be, for example, processor K or processor J of FIG. 7. The authorization request may include a monetary value associated with the desired transaction (e.g., $500).

At step 40, the processor may use the PAN to determine whether the customer's account has sufficient credit available and to otherwise determine whether or not the customer is authorized to complete the desired transaction. If the customer's PAN is authorized, the processor may tokenize the PAN using the tokenization server 18 at the processor. The tokenization server 18 may generate a global token (step 40).

At step 42, the SPE process 22 at the processor may convert the token from the tokenization server into a merchant-specific token. In particular, processor 22 may use SPE process 22 to perform an SPE encryption operation on the token from the tokenization server. The SPE encryption operation may optionally include a data embedding operation in which a processor ID that identifies the processor or other suitable information is embedded into the encrypted version of the token from the tokenization server. For example, a processor ID that identifies processor "K" may be embedded into encrypted versions of tokens generated by processor K. The SPE encryption process 22 that is used in encrypting the token preferably uses an appropriate cryptographic key. For example, the SPE encryption process at merchant Q (e.g., merchant K) may use a key (e.g., keyA) that is shared with the merchant (e.g., merchant A) for which the token is being encrypted. Keys such as keyA may be shared during system setup operations (e.g., over network 16, via physical delivery on a memory device, using identity-based encryption key sharing techniques, or using other suitable key sharing techniques).

Merchant X (e.g., merchant A) may receive the encrypted version of the token at step 44 and may decrypt the token using an appropriate key (e.g., keyA) and SPE process 22 at merchant X. As described in connection with FIG. 4, the embedded processor ID and other embedded information may be extracted during the decryption process. During the operations of step 46, merchant X may formulate a settlement request using the decrypted version of the token and the settlement amount (e.g., $137). The merchant can use the extracted processor ID to direct the settlement request to the appropriate processor 14. For example, if the processor ID identifies the processor that encrypted the token as processor K, the merchant can use the extracted processor ID to direct the settlement request to processor K.

At step 48, the settlement process at the processor can use the tokenization server at the processor to detokenize the received token and thereby determine the PAN that corresponds to the received token. The PAN and the monetary value from the settlement requests may then be used by the settlement process in settling the payment transaction.

The foregoing is merely illustrative of the principles of this invention and various modifications can be made by those skilled in the art without departing from the scope and spirit of the invention.

What is claimed is:

1. A method for securing tokens in a payment system to prevent unauthorized access to the tokens, wherein the payment system comprises merchant computing equipment associated with a merchant and payment card processor computing equipment associated with a payment card processor, the method comprising:

receiving, at the payment card processor computing equipment, an authorization request from the merchant computing equipment over a communications network, wherein the authorization request identifies a primary account number;

generating, using a tokenization server at the payment card processor computing equipment, a token based on the primary account number;

storing the token in a database at the payment card processor computing equipment;

encrypting the token using structure preserving encryption computing equipment at the payment card processor computing equipment, wherein encrypting the token using the structure preserving computing equipment preserves a length of the token wherein the token has the same length as the encrypted token, wherein data stored in the token is of a first data format, which includes characters from a first character space, wherein a portion of data stored in the encrypted token is of a second data format, which includes characters from a second character space that has a greater size than the first character space, and wherein encrypting the token using the structure preserving encryption computing equipment at the payment card processor computing equipment comprises:

encrypting an entirety of the token using a merchant-specific key associated with the merchant computing equipment; and embedding identifier information that identifies the payment card processor computing equipment in the portion of the data stored in the encrypted token using the merchant-specific key, wherein the portion of the data stored in the encrypted token of the second data format comprises data for the token, data for the merchant-specific key associated with the merchant computing equipment, and data for the identifier information that identifies the payment card processor computing equipment;

providing, using the payment card processor computing equipment, the encrypted token to the merchant computing equipment over the communications network to authorize a transaction at the merchant while preventing unauthorized access to the token;

performing, at the merchant computing equipment, a decryption process on the encrypted token to retrieve the token, wherein the embedded payment card processor identifier information is extracted from the encrypted token during the decryption process;

identifying a particular payment card processor computing equipment based on the embedded payment card processor identifier information extracted from the encrypted token during the decryption process;

generating, at the merchant computing equipment, a settlement request that includes the retrieved token and that requests settlement of a purchase transaction associated with the primary account number;

providing, using the merchant computing equipment, the settlement request to the identified particular payment card processor computing equipment over the communications network;

obtaining, using the identified particular payment card processor computing equipment, the token from the settlement request received from the merchant computing equipment;

detokenizing, using the identified particular payment card processor computing equipment, the token obtained from the settlement request to recover the primary account number;

settling, using settlement computing equipment at the identified particular payment card processor computing equipment, the purchase transaction using the recovered primary account number; and transmitting, from the identified particular payment card processor computing equipment, information identifying completion of the purchase transaction to the merchant computing equipment over the communications network in response to settling the purchase transaction using the recovered primary account number.

2. The method defined in claim 1 wherein detokenizing the token comprises using the token to retrieve the primary account number from the database.

3. The method defined in claim 1 further comprising:
encrypting, using additional structure preserving computing equipment at the merchant computing equipment, an entirety of the encrypted token to generate a double-encrypted token, wherein the double-encrypted token has the same length as the encrypted token.

4. The method defined in claim 3 wherein the merchant-specific key is used by only the merchant and no other merchants and wherein encrypting the encrypted token comprises performing encryption using a key that is different from the merchant-specific key and that is used by a sub-entity of the merchant.

5. The method defined in claim 1, wherein embedding the information in the token comprises converting the information from the first data format to the second data format.

6. The method defined in claim 1, wherein the payment system further comprises a subentity of the merchant, additional merchant computing equipment associated with an additional merchant, an additional sub-entity of the additional merchant, and additional payment card processor computing equipment associated with an additional payment card processor, wherein the additional payment card processor computing equipment uses a first merchant-specific key while encrypting another token when sending the encrypted another token to the merchant computing equipment, wherein the additional payment card processor computing equipment uses a second merchant-specific key while encrypting the another token when sending the encrypted another token to the additional merchant computing equipment, and wherein the first merchant-specific key is different from the second merchant specific key.

7. A method of securing tokens in a payment card purchase transaction processing system, comprising:
receiving, at processor computing equipment, a primary account number of a payment card from merchant computing equipment;

generating, using the processor computing equipment, a token corresponding to the primary account number;

encrypting, using the processor computing equipment, an entirety of the token while embedding information in the token, wherein the token has the same length as the encrypted token, wherein data stored in the token is of a first data format, which includes characters from a first character space, wherein data stored in a portion of the encrypted token is of a second data format, which includes characters from a second character space that has a greater size than the first character space, wherein the embedded information is extracted from the encrypted token during a decryption process performed at the merchant computing equipment, and wherein encrypting the entirety of the token comprises:
encrypting, by the processor computing equipment, the entirety of the token using a merchant-specific key associated with the merchant computing equipment; and embedding, by the processor computing equipment, the information in the portion of the encrypted token using the merchant-specific key, wherein the information comprises identifier information that identifies the processor computing equipment;

transmitting, using the processor computing equipment, the encrypted token having the embedded information to the merchant computing equipment over a communications network to authorize a transaction associated with the merchant computing equipment while preventing unauthorized access to the token over the communications network;

sending, from the merchant computing equipment to the processor computing equipment, a settlement request that requests settlement of a purchase transaction associated with the primary account number to the processor computing equipment, wherein sending the settlement request to the processor computing equipment comprises, using the merchant computing equipment:
decrypting the encrypted token to obtain a decrypted token;

extracting the embedded identifier information from the decrypted token;

generating the settlement request, the settlement request including the decrypted token;

identifying a particular processor computing equipment based on the embedded identifier information extracted from the encrypted token; and routing the settlement request from the merchant computing equipment to the identified particular processor computing equipment;

determining, by the identified particular processor computing equipment, the primary account number using the decrypted token included in the settlement request; and settling, using settlement computing equipment at the identified particular processor computing equipment, the purchase transaction using the determined primary account number; and transmitting, from the identified particular processor computing equipment, information identifying completion of the purchase transaction to the merchant computing equipment over the communications network in response to settling the purchase transaction using the determined primary account number.

8. The method defined in claim 7, wherein the payment card purchase transaction processing system comprises the processor computing equipment, the merchant computing equipment, additional processor computing equipment, and additional merchant computing equipment, wherein the additional processor computing equipment uses a first merchant-specific key for encrypting another token when sending the encrypted another token to the merchant computing equipment, wherein the additional processor computing equipment uses a second merchant-specific key for encrypting the another token when sending the encrypted another token to the additional merchant computing equipment, and wherein the first merchant-specific key is different from the second merchant specific key.

9. A payment card purchase transaction processing system, comprising:
  merchant computing equipment; and
  payment processor computing equipment programmed to:
    receive a primary account number of a payment card from the merchant computing equipment;
    generate a token corresponding to the primary account number;
    encrypt, using a merchant-specific key associated with the merchant computing equipment, an entirety of the token, wherein the token has the same length as the encrypted token, wherein data stored in the token is of a first data format, which includes characters from a first character space, wherein a portion of data stored in the encrypted token is of a second data format, which includes characters from a second character space that has a greater size than the first character space, wherein encrypting the entirety of the token comprises embedding information in the portion of the data stored in the encrypted token using the merchant-specific key, wherein the information comprises identifier information that identifies the processor computing equipment, and wherein the portion of the data stored in the encrypted token of the second data format comprises data for the token, data for the merchant-specific key associated with the merchant computing equipment, and data for the identifier information that identifies the processor computing equipment; and
    transmit the encrypted token having the embedded information to the merchant computing equipment over a communications network to authorize a transaction associated with the merchant computing equipment while preventing unauthorized access to the token over the communications network;
  wherein the merchant computing equipment is to:
    decrypt the transmitted encrypted token to obtain a decrypted token;
    extract the embedded identifier information from the decrypted token;
    identify a particular processor computing equipment based on the embedded identifier information extracted from the encrypted token;
    generate a settlement request that includes the retrieved token and that requests settlement of a purchase transaction associated with the primary account number; and
    provide the settlement request to the identified particular processor computing equipment;
  wherein the identified particular processor computing equipment is programmed to:
    determine the primary account number using the decrypted token included in the settlement request;
    settle the purchase transaction using the determined primary account number; and
    transmit information identifying completion of the purchase transaction to the merchant computing equipment over the communications network in response to settling the purchase transaction using the determined primary account number.

* * * * *